(12) United States Patent
Schulz

(10) Patent No.: US 7,516,034 B1
(45) Date of Patent: Apr. 7, 2009

(54) MAGNETIC FLOW TRANSMITTER HAVING MULTIPLE FLOWTUBE DATA SETS

(75) Inventor: Robert K. Schulz, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/856,922

(22) Filed: Sep. 18, 2007

(51) Int. Cl.
*G01F 1/58* (2006.01)
*G06F 17/00* (2006.01)

(52) U.S. Cl. .................. 702/100; 702/45; 702/50; 73/1.34; 73/1.35

(58) Field of Classification Search .......... 702/100, 702/45, 50
See application file for complete search history.

(56) References Cited

U.S. PATENT DOCUMENTS

| | | | |
|---|---|---|---|
| 5,402,685 A | 4/1995 | Brobeil | 73/861.12 |
| 6,505,517 B1 | 1/2003 | Eryurek et al. | 73/861.08 |
| 6,539,981 B1 | 4/2003 | Kleven et al. | 138/143 |
| 6,615,149 B1 | 9/2003 | Wehrs | 702/76 |
| 7,073,393 B2 | 7/2006 | Coursolle | 73/861.12 |
| 7,093,500 B2 | 8/2006 | Schulz et al. | 73/861.15 |
| 2002/0112525 A1 | 8/2002 | Brockhaus | 73/1.16 |
| 2004/0200259 A1* | 10/2004 | Mattar | 73/1.34 |
| 2006/0090537 A1* | 5/2006 | Mattar | 73/1.34 |
| 2007/0193334 A1* | 8/2007 | Hays | 73/1.34 |

FOREIGN PATENT DOCUMENTS

| | | |
|---|---|---|
| EP | 0 548 439 A1 | 6/1993 |
| EP | 1 217 337 A2 | 11/2001 |
| GB | 2 348 963 A | 4/2000 |

OTHER PUBLICATIONS

Rosemount 8700 Series, Product Data Sheet 00813-0100-4727, Rev NB, Catalog 2006-2007; "Rosemount 8700 Series Magnetic Flowmeter Systems", 59 pages.
Notification of Transmittal of the International Search Report and the Written Opinion, dated Jan. 20, 2009, in connection with corresponding application Serial No. PCT/US2008/010534.

* cited by examiner

*Primary Examiner*—Hal D Wachsman
(74) *Attorney, Agent, or Firm*—Westman, Champlin & Kelly, P.A.

(57) ABSTRACT

A magnetic flow transmitter includes a calibration converter that performs a calibration calculation routine to produce a calibration constant that couples to a flow converter. A data set input couples a flowtube data set that is associated with a unique flowtube to the calibration converter. A data table associates multiple flowtube data sets with multiple calibration calculation routines. The data table couples a calibration calculation routine that is unique to the flowtube data set to the calibration converter.

20 Claims, 6 Drawing Sheets

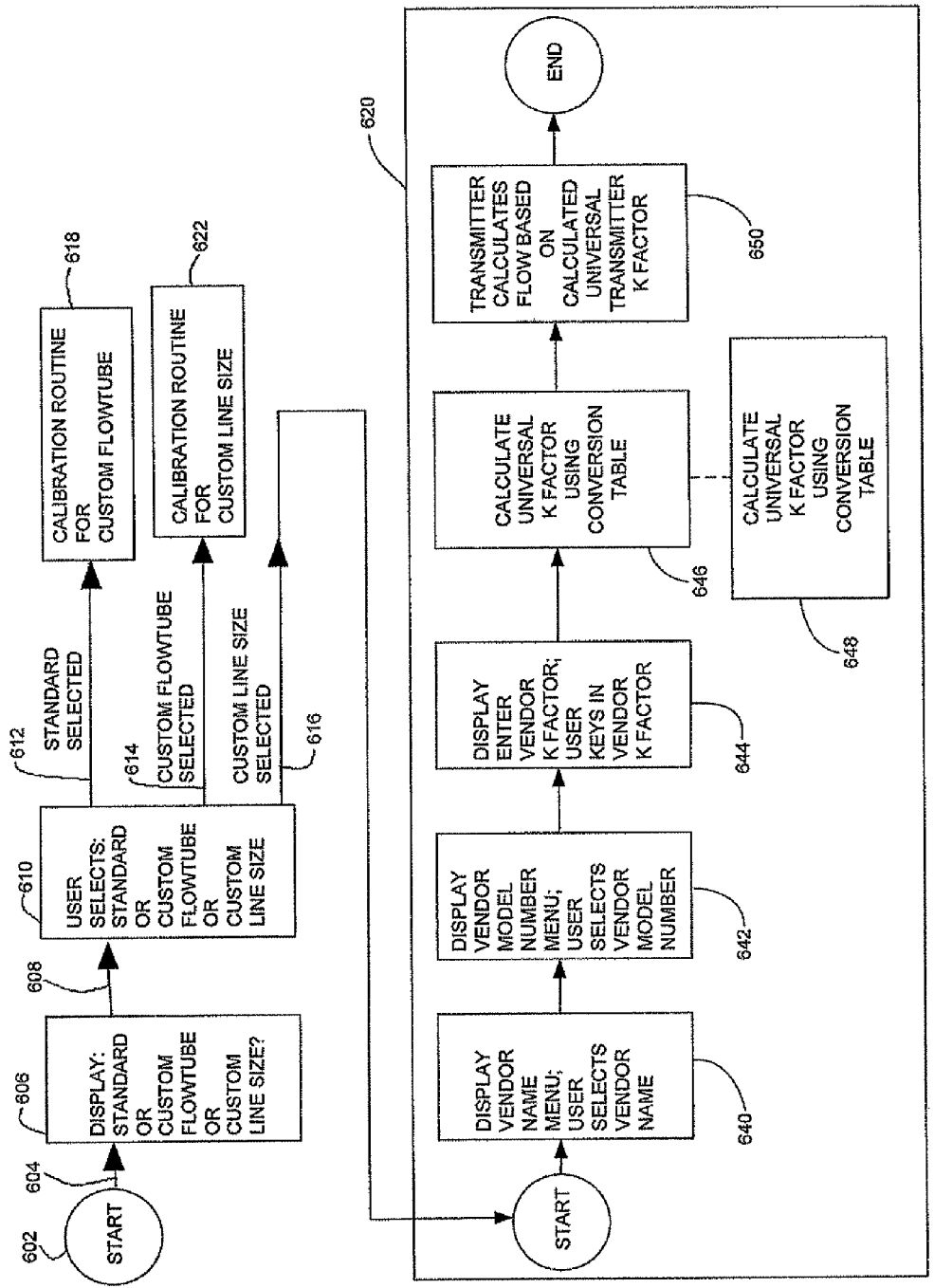

MAGNETIC FLOW TRANSMITTER HAVING MULTIPLE FLOWTUBE DATA SETS

BACKGROUND OF THE INVENTION

Magnetic flowmeter systems include a flowtube assembly and a transmitter assembly that are electrically connected to one another by one or more cables. The flowtube assembly receives an electric current from the transmitter assembly. The electric current produces a magnetic field in an insulated bore of the flowtube assembly. A liquid flows through the magnetic field in the insulated bore. The motion of the liquid in the magnetic field produces a flow voltage. According to Faraday's law of electromagnetic induction, the flow voltage is proportional to the velocity of flow. Electrodes in the insulated bore contact the flow voltage and the flow voltage is coupled by a cable to the transmitter assembly. The transmitter assembly measures the voltage and provides one or more scaled electrical outputs that represent the rate of flow of the liquid.

The flow voltage is a function of the shape of the magnetic field in the insulating bore, the current amplitude, the electrode spacing, the velocity of the fluid flow between the electrodes and other flowtube assembly design factors. The velocity of the fluid flow is a function of the volumetric flow rate of the fluid and the diameter of the insulated bore near the electrodes. The performance of the flowtube assembly can be approximated by Equations 1 and 2:

$$K=E/(IQ) \quad \text{Equation 1}$$

$$Q=V_1(\pi)(D_1/2)^2=V_2(\pi)(D_2/2)^2 \quad \text{Equation 2}$$

where E is the flow voltage, I is the electric current, Q is the volumetric flow rate, and K is a constant that represents the performance of the flowtube assembly. $V_1$, $D_1$ are the flow velocity and bore diameter near the electrodes. $V_2$, $D_2$ are the flow velocity and bore diameter in adjacent piping to which the flowtube assembly is coupled. The constant K takes into account all of the effects of electrode spacing, magnetic field shape, velocity as a function of volumetric flow rate and other design factors.

During manufacture or service of the flowtube assembly, the flowtube assembly is temporarily connected to a calibration system (meter prover, flow stand, flow laboratory, etc.). The calibration system provides a calibrated electric current and a calibrated volumetric flow rate. The calibration system measures the flow voltage. The constant K is calculated from the known values of current and volumetric flow rate and the measured value of flow voltage. The calculated constant K is recorded and serves as calibration data for the flowtube assembly. Typically, a manufacturer's calibration data is recorded on a nameplate of the flowtube assembly in a form that is peculiar to a particular manufacturer.

Different manufacturers use different systems of units in the data recorded on the flowtube assembly nameplate. In some cases, the data recorded on the nameplate is referenced indirectly to flow velocity at an assumed nominal pipe diameter rather than being referenced directly to volumetric flow rate. In some cases, the nameplate data can be subject to an assumed level of electric current provided the manufacturer's transmitter and represents (KI) instead of K. The complexity of the problem is compounded by the fact that transmitters are typically designed to operate with a range of many different diameters of flowtubes, and these diameters may, or may not be integrated into the nameplate data. The problem is further compounded by the fact that the nameplate data may, or may not, have a scale factor included in the same number that represents the constant K.

Different manufacturers design magnetic transmitter assemblies to accept a data entry of nameplate data that is taken from the manufacturer's own flowtube assemblies. There is usually no provision to enter nameplate data from flowtube assemblies made by another manufacturer.

The risks, complexity and transaction costs of converting one manufacturers nameplate data to the format of another manufacturer are so high that industrial users generally will not attempt to use a mixed flowmeter system that includes a flowtube assembly from one manufacturer with a transmitter assembly from another manufacturer. Most industrial users also do not have on-site access to flow calibration systems that could be used with mixed flowmeter systems to perform flow calibration that could bypass use of the nameplate data.

A method and apparatus are needed that will permit a user to utilize a mixed flowmeter system without the complexity of learning multiple manufacturers nameplate data system and computing a conversion from one nameplate data system to a different nameplate data system.

SUMMARY

Disclosed is a magnetic flow transmitter. The magnetic flow transmitter comprises a flow converter which calculates a scaled output representative of flow.

The magnetic flow transmitter further comprises a calibration converter. The calibration converter performs a calibration calculation routine. The routine produce a calibration constant. The calibration constant couples to the flow converter.

The magnetic flow transmitter further comprises a data set input. The data set input couples a flowtube data set that is associated with a unique flowtube to the calibration converter.

The magnetic flow transmitter also includes a data table. The data table associates multiple flowtabe data sets with multiple calibration calculation routines. The data table couples a calibration calculation routine that is unique to the flowtube data set to the calibration converter.

BRIEF DESCRIPTION OF THE DRAWINGS

FIG. 6 illustrates a third aspect of operation of a calibration converter circuit.

DETAILED DESCRIPTION

In the embodiments described below, a universal transmitter is configured to be conveniently calibrated to flowtubes that have been designed for use with the universal transmitter, and also configured to be conveniently calibrated to flowtubes from other manufactures that have not been designed for use with the universal transmitter.

A data table is provided in the universal transmitter that associates an appropriate calibration calculation routine with a model numnber or a name of a flow tube. The technician installing a flow system does not need to know any of the details of a calibration method used by a flowtube manufacturer. Once the flowtube is identified the transmitter automatically provides the appropriate routine for inputting a calibration data set marked on the flowtube and automatically provides a calibration routine unique to the flowtube either by model number for a standard flowtube or by name for a custom flowtube.

Figure 1:
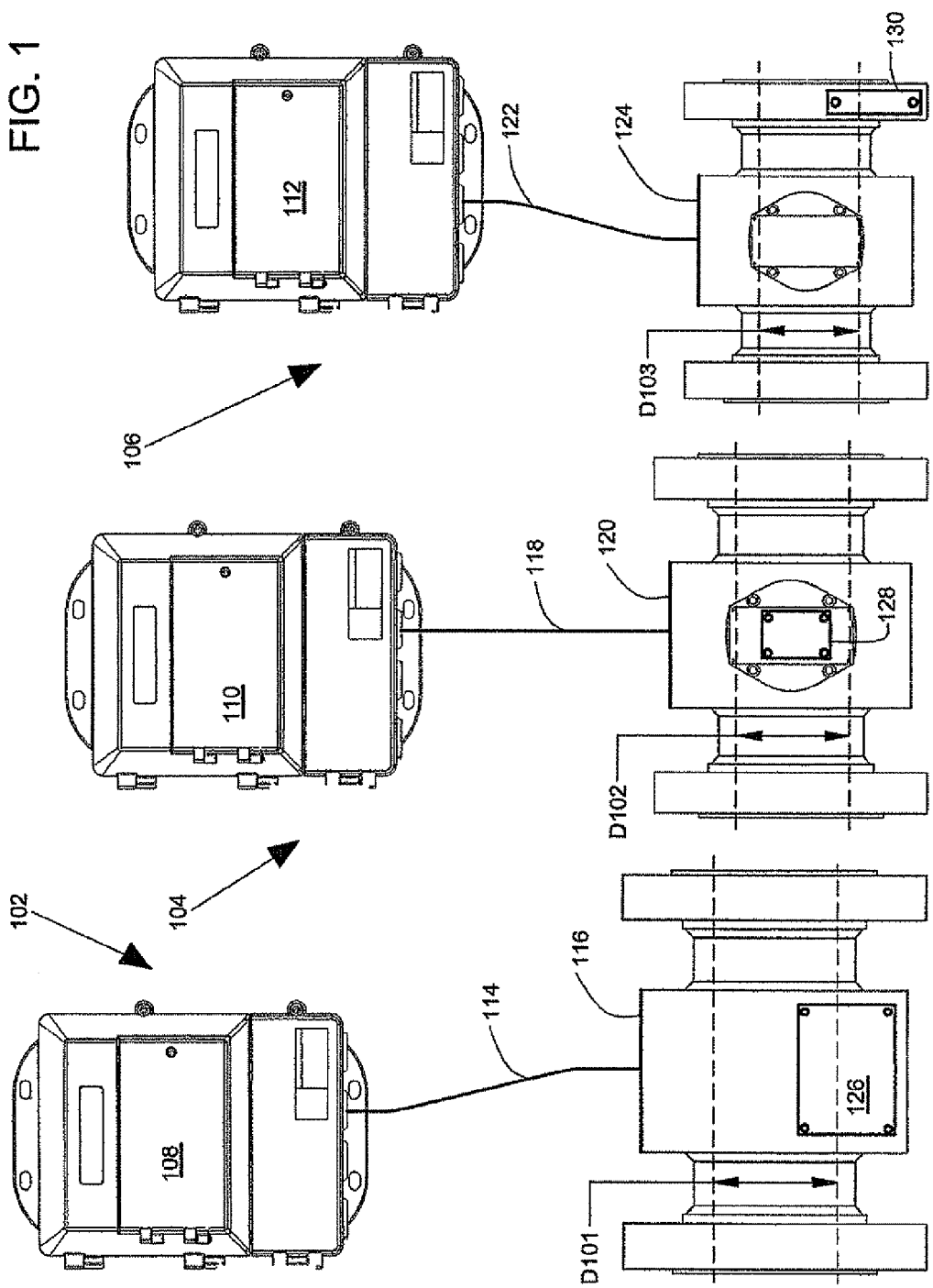
FIG. 1 illustrates a portion of an industrial installation with three magnetic flowmeter systems that each include a universal transmitter.

FIG. 1 illustrates a portion of an industrial installation with three magnetic flowmeter systems 102, 104, 106 that each include a device referred to here as a universal transmitter 108, 110, 112. The first universal transmitter 108 is connected by a cable 114 to a first flowtube assembly 116 from a first manufacturer. The second universal transmitter 110 is connected by a cable 118 to a second flowtube assembly 120 from a second manufacturer. The third universal transmitter 112 is connected by a third cable 122 to a third flowtube assembly 124 from a third manufacturer. The term "universal transmitter", as used in this application, refers to a magnetic flow transmitter that can be calibrated for use with flowtube assemblies from multiple manufacturers that use systems for recording calibration information that are different from the calibration recording system that is native to the manufacturer of the universal transmitter, or that have no calibration information supplied by the manufacturer.

Each of the universal transmitters 108, 110, 112 have the same design as one another. Each of the flowtube assemblies 116, 120, 124 is from a different manufacturer. Each of the flowtube assemblies 116, 120, 124 have nameplate data 126, 128, 130 recorded on them. Each nameplate data 126, 128, 128 has a different scheme for inferring a "K constant" from the nameplate data. Each of the flowtube assemblies 116, 120, 124 has an insulated bore with a diameter D101, D102 or D103. The diameters D101, D102, D103 are generally not the same numerical value. Each of the universal transmitters 108, 110, 112 is provided with a data entry capability so that the nameplate data 126, 128, 130 from different manufacturers can be entered into the universal transmitter as described below in connection with FIGS. 3-6.

Figure 2:
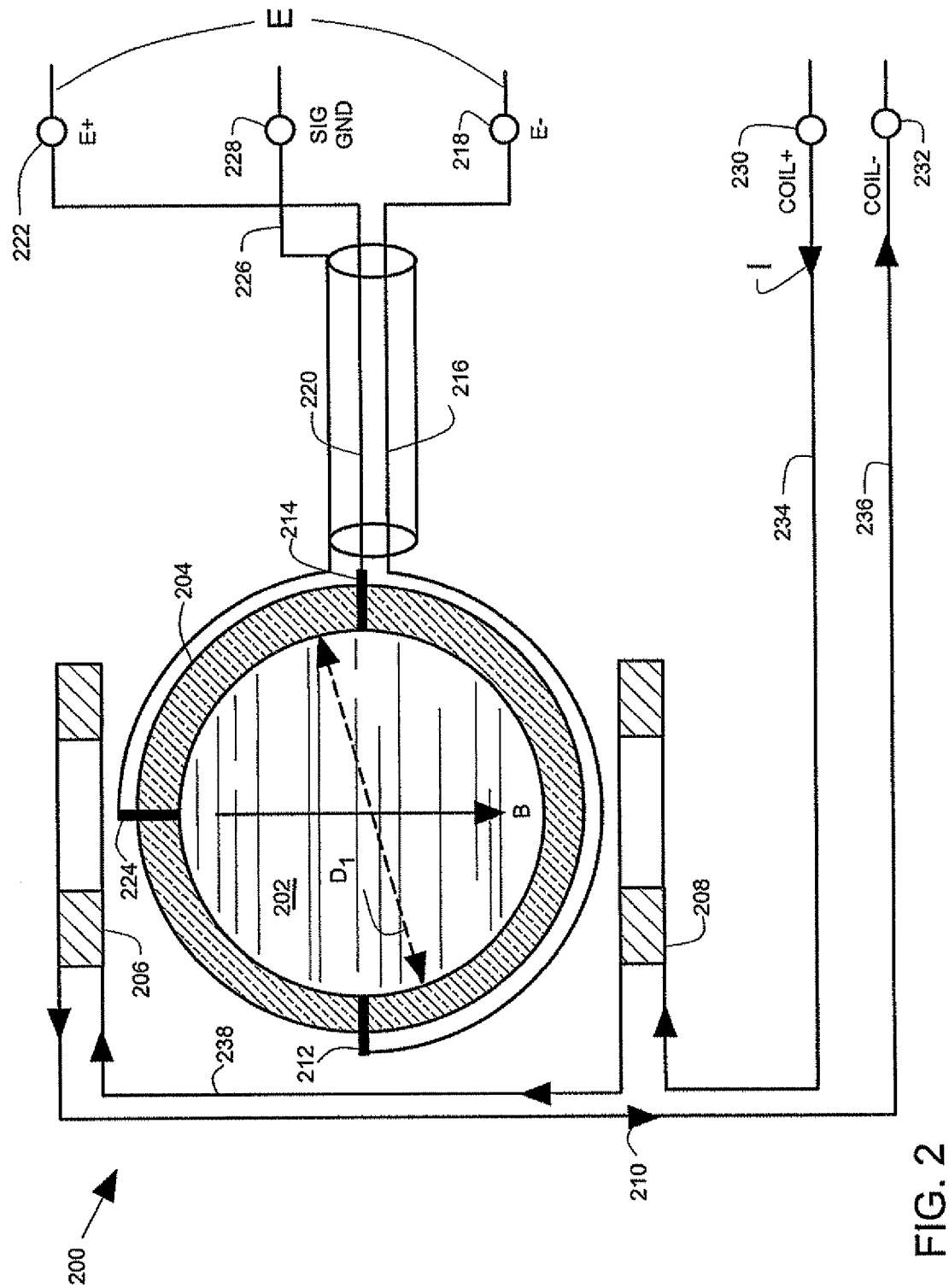
FIG. 2 illustrates a magnetic flowtube assembly.

FIG. 2 illustrates a magnetic flowtube assembly 200. The flowtube assembly 200 carries a flow of a liquid 202 through a conduit 204. Magnet coils 206, 208 carry an electric current (I) 210 that produces a magnetic field B in the liquid 202. As the liquid 202 flows through the magnetic field B, a potential difference is generated in the liquid 202 according to Faraday's law of magnetic induction. The potential difference is sensed by flowtube electrodes 212, 214 and is generally proportional to a flow velocity of the liquid 202 through the conduit 204.

According to this illustration embodiment, the flowtube electrode 212 is connected by a lead 216 to an minus electrode terminal 218. The flowtube electrode 214 is connected by a lead 220 to a plus electrode terminal 222. A flow voltage E is present between terminals 218, 222. A ground electrode 224 provides a process fluid ground connection. The ground electrode 224 is connected by a lead 226 (which can include a cable shield as illustrated) to a signal ground terminal 228. The ground electrode 224 can be a metal pin in the conduit 204, or can alternatively be ground rings or metal piping in contact with the liquid 202. Coil terminals 230, 232 are connected by leads 234, 236, 238 to the magnet coils 206, 208 to supply the electric current 210. The electric current (I) 210 is typically a ramped square wave with an amplitude typically about 0.5 to 0.075 ampere and fundamental frequency typically about 3 to 75 Hertz.

The terminals 218, 222, 228, 230, 232 on the flowtube assembly 200 are connectable by a cable assembly to a magnetic flowmeter transmitter such as a universal flow transmitter. The cable assembly typically includes an electrostatically shielded cable for electrode leads and a twisted pair or shielded cable for coil leads. The flowtube assembly 200 is typically mounted in a process piping system, and connects via the cable assembly to the universal magnetic flowmeter transmitter. The universal magnetic flowmeter transmitter may be mounted on the flowtube assembly 200 and connected by a short cable, or the universal transmitter may be mounted in a remote location and connected by a long cable (or cables) as illustrated in FIG. 1.

Figure 3:
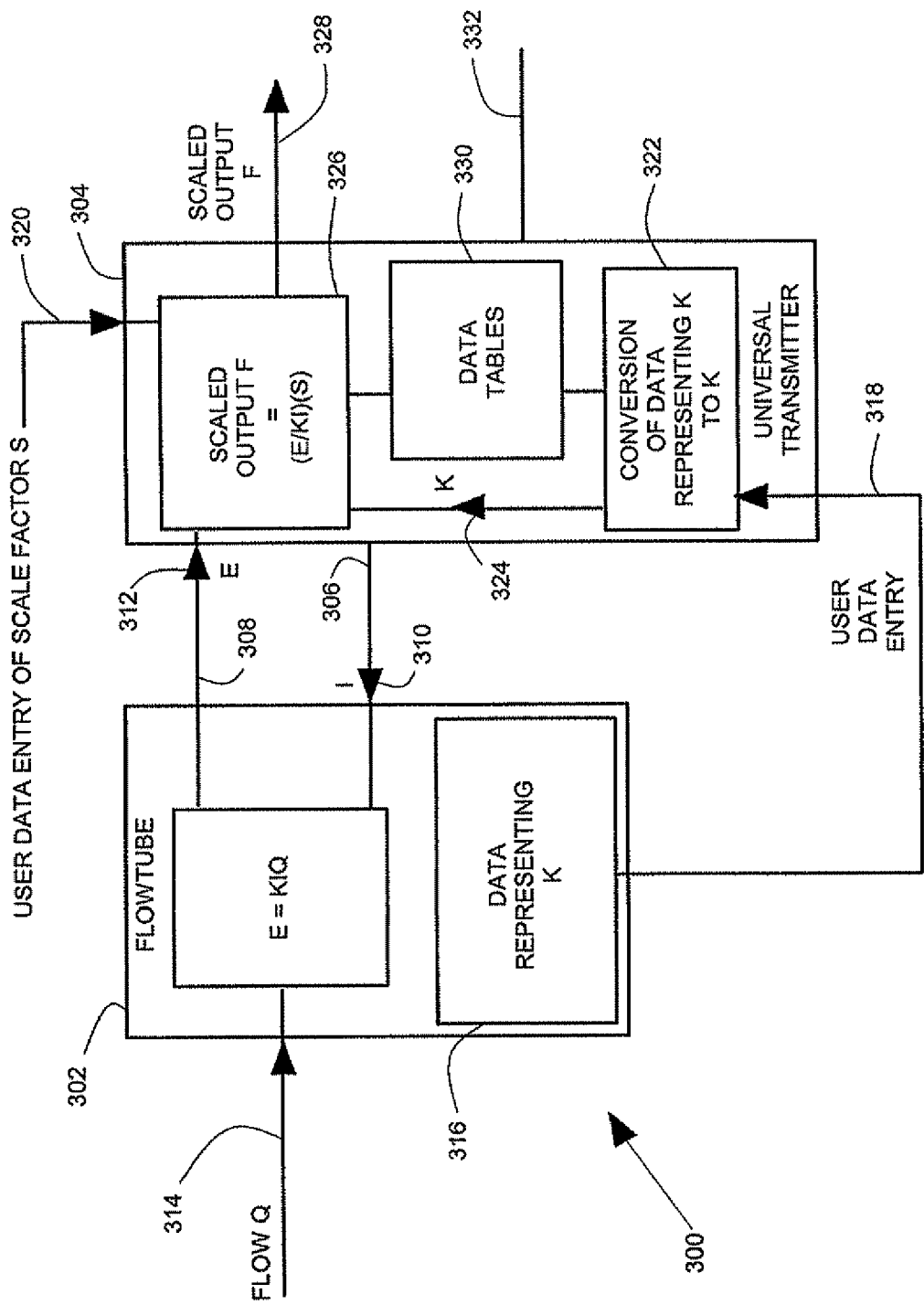
FIG. 3 illustrates a block diagram of a magnetic flowmeter system that includes a flowtube assembly and a universal transmitter

FIG. 3 illustrates a block diagram of a magnetic flowmeter system 300 that includes a flowtube assembly 302 (also called flowtube 302) and a universal transmitter 304. The universal transmitter 304 connects to the flowtube assembly 302 by cables 306, 308. The universal transmitter 304 provides a current (I) 310 to the flowtube assembly 302 and the flowtube assembly 302 provides a flow voltage (E) 312 to the universal transmitter 304. The flowtube assembly 302 senses a volumetric flow (Q) 314 of fluid passing through the flowtube assembly 302.

Data 316 (also called flowtube data set 316) represents the constant K (see Equation 1) that is associated with the flowtube assembly 302. The data 316 can also include model number, serial number, line size and other data about the flowtube assembly or about a transmitter (not a universal transmitter) which the flowtube manufacturer has associated with the flowtube assembly 302. The data 316 can be attached to the flowtube assembly 302 (as illustrated at 126, 128, 130 in FIG. 1). The data 316 can alternatively be provided on a hanging tag attached to the flowtube assembly 302 or accessible on-line from a manufacturer's website or provided by other means.

A user can transfer the data 316 as illustrated at line 318 to the universal transmitter 304. The user can also provide scale factor S information as illustrated at line 320 to the universal transmitter 304. The universal transmitter 304 includes calibration converter circuitry 322 which converts the user data entry 318 to a constant K at 324 by performing a calibration calculation routine. The constant K at 324 couples to a flow converter circuit 326. The flow converter circuit 326 receives the constant K at 324, the flow voltage E at 312 and the scale factor S at 320. The flow converter circuit 326 provides a scaled flow output F at 328. In one aspect, the scaled flow output is F=(E/KI)(S). Multiple scaled outputs can also be provided. In one aspect, the flow converter circuit 326 comprises options to accept a users' scale factor S data in multiple diverse formats such as pulses per gallon, pulses per liter, milliamperes per gallon, milliamperes per liter, milliamperes per (feet/second) or pulses per (meter/second).

In one aspect, the calibration converter circuit 322 and the flow converter circuit 326 are realized as an embedded microprocessor/DSP system. In another aspect, the embedded microprocessor/DSP (Digital Signal Processor) system comprises a microprocessor/DSP, RAM, ROM and electrically alterable non-volatile RAM, a keypad and an optical display. In yet another aspect, the embedded microprocessor/DSP system comprises a disc drive or electrically alterable ROM.

The universal transmitter 304 further includes data tables 330. In one aspect, the data tables 330 are stored in electrically alterable ROM or other storage mechanism. The universal transmitter 304 comprises an input 332 for receiving data for the data tables 330. The data tables include a database of conversion data for converting multiple manufacturers' data to the constant K by performing arithmetic calculations. The conversion data can be data obtained from multiple manufacturers, data obtained by flow calibrations of sample flowtube assemblies from multiple manufacturers or both. In another aspect, the calibration converter circuit 322 includes a limit test on K factors that identifies K factors that indicate flow rates outside the range of flow velocities of 1-12 meters per second. The limit test provides an alarm output to warn the user that the K factor indicates a possibly erroneous data entry. Data and database entry into the universal transmitter 304 can be realized by use of a keyboard/display that is part of the universal transmitter 304 or by downloading from a personal computer or handheld calibration device or other user interface.

In one aspect the universal transmitter 300 can automatically control the level of the current I to a level that is most compatible with the flowtube assembly based on the model number of the flowtube assembly. Automatic setting of the level of the current I ensures an adequate level of flow voltage and avoids overheating the coils in the flowtube assembly or saturating magnetic cores in the flowtube assembly.

Figure 4:
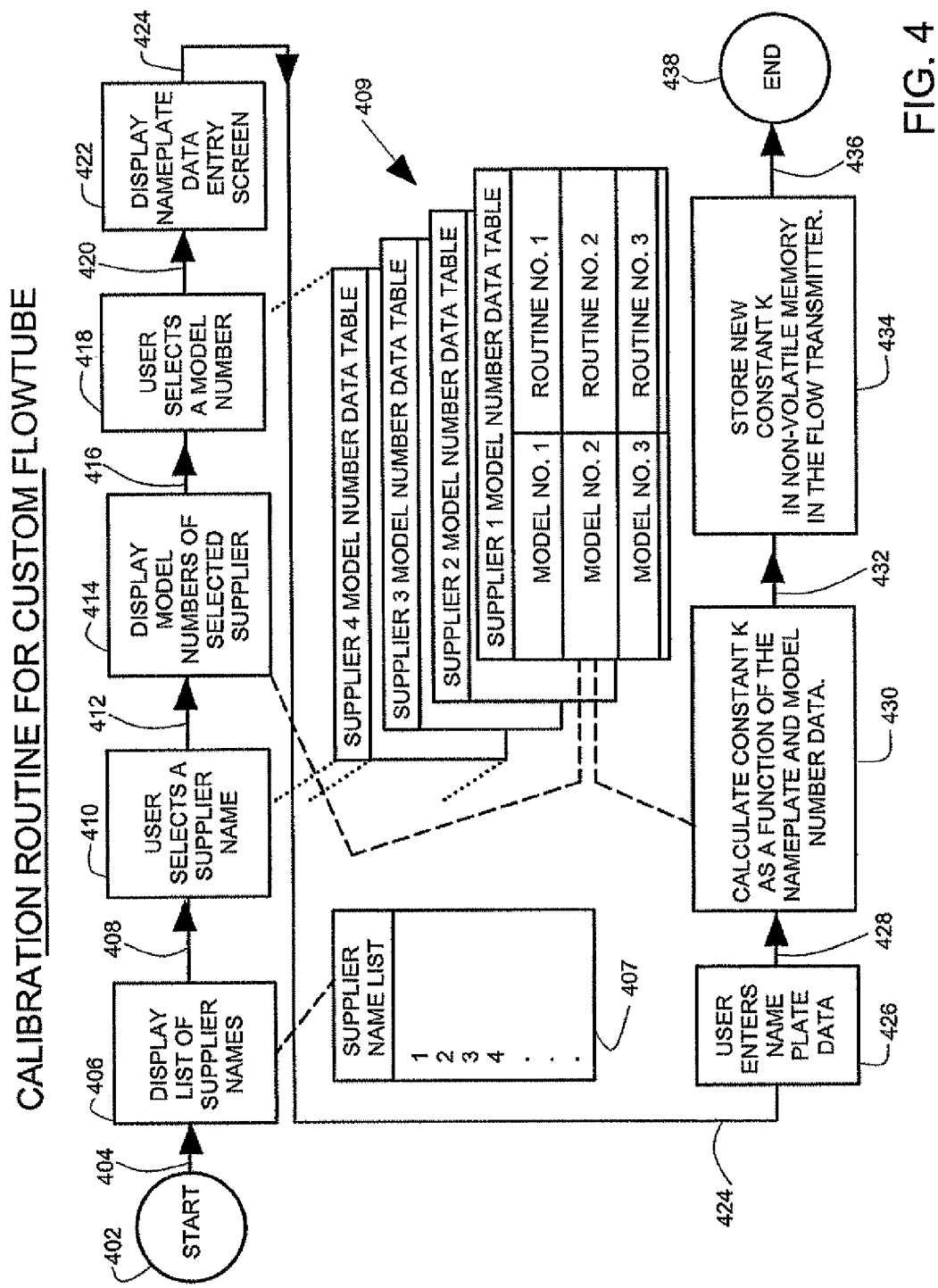
FIG. 4 illustrates a first aspect of operation of a calibration converter circuit.

FIG. 4 illustrates a first aspect of operation of a calibration converter circuit such as calibration converter circuit 322 in FIG. 3, Processing begins at start 402 when a user enters a command to enter a calibration routine.

Processing continues along line 404 to action block 406. At action block 406, a list of suppliers (e.g., manufacturers) is displayed to the user. The list of suppliers is obtained from a field in a data table of supplier names that is part of a database in the universal transmitter. After completion of action block 406, processing continues along line 408 to action block 410.

At action block 410, the user enters a command to select one supplier from the list of suppliers. The user selects the supplier of the flowtube assembly that the user has connected to the universal transmitter. Each supplier in the list of suppliers has a unique supplier number in a key field of the supplier data table. The key field points to a calibration data table associated with that supplier number. After completion of action block 410, processing continues along line 412 to action block 414.

At action block 414, a list of available model numbers is displayed to the user. After display of the model number, processing continues along line 416 to action block 418 and the user can select a model number from the list, or else cancel the calibration routine. If a valid model number is selected, then processing continues along line 420 to action block 422.

At action block 422, a display is provided to the user that prompts the user enter data K' (taken from the connected flowtube nameplate, for example) that is related to the K factor. Such entered data K' is typically not the K factor, but it data from which the K factor can be calculated using model number data that is pointed to in the database. The data represents the ratio of the electrode signal to coil current. In one aspect, the display is arranged to simulate an image arrangement that is similar to the nameplate arrangement on the flowtube assembly. After completion of action block 422, processing continues along line 424 to action block 426. At action block 426, the user enters nameplate information K' that is related to the constant K. After completion of action block 426, processing continues along line 428 to action block 430.

At action block 430, the constant K is calculated as a function of the nameplate information K' and the model number information. The function that is calculated is typically different for each model of flowtube assembly. Each function is stored in a field associated with each model number. After completion of action block 430, processing continues along line 432 to action block 434.

At action block 434, the constant K is stored in non-volatile memory in the universal transmitter. Alternatively, a calibration number can be generated from the K factor and stored in the memory. The calibration data has now been calculated, stored and available to a flow converter such as flow converter 426 in FIG. 4. After completion of action block 434, processing continues along line 436 to end 438. At end 438, the calibration routine is terminated, and the operation of a flow converter, such as flow converter 426 in FIG. 3, continues using the new value of the saved constant K or calibration number.

Figure 5:
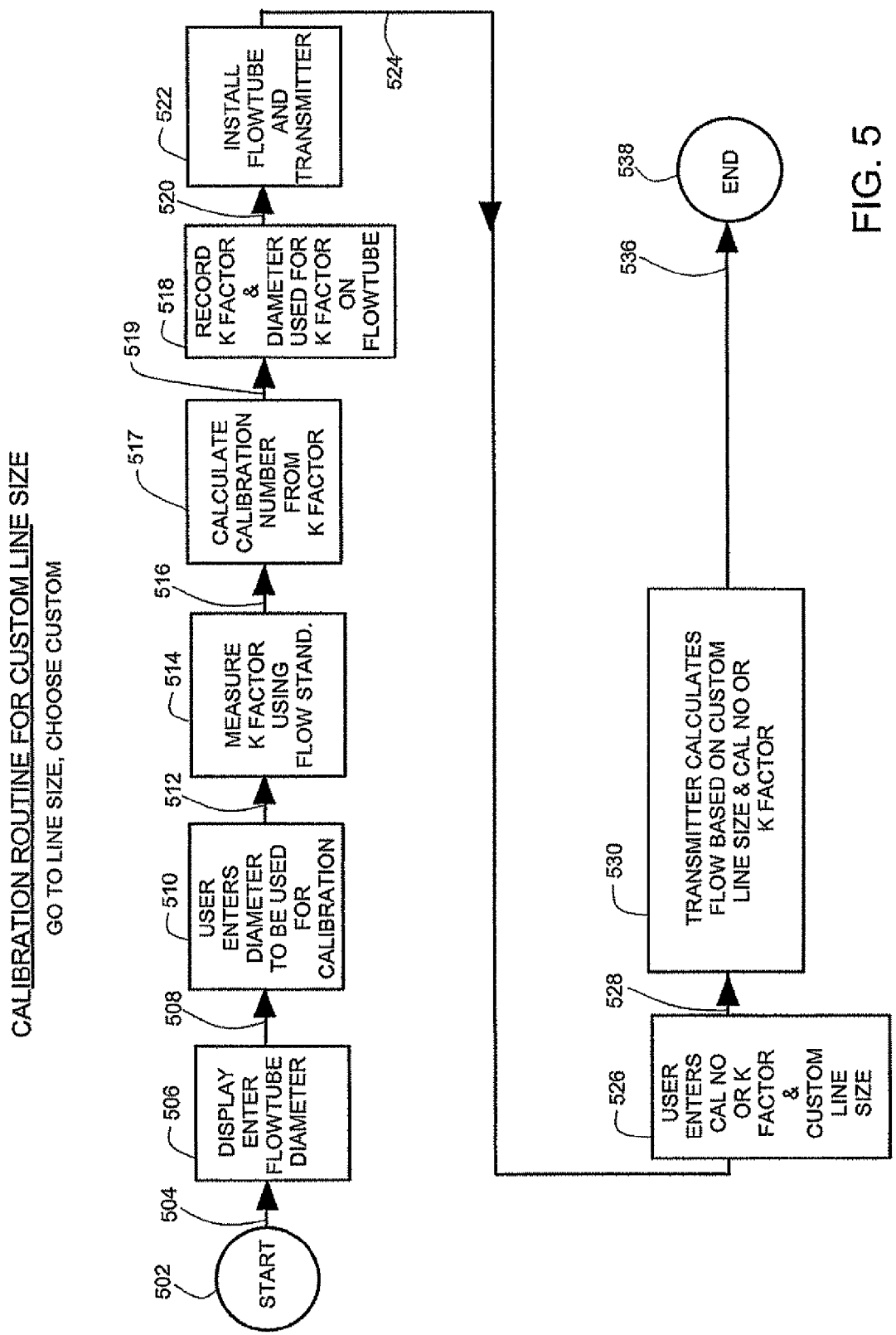
FIG. 5 illustrates a second aspect of operation of a calibration converter circuit.

FIG. 5 illustrates a second aspect of operation of a calibration converter circuit such as calibration converter circuit 322 in FIG. 3. Processing begins at start 502 when a user selects a calibration routine. After completion of start 502, processing continues along line 504 to action block 506. At action block 506, a data entry screen is displayed that prompts the user to enter the inside diameter of the bore and a name or representative line size for the flowtube assembly that is connected to the universal transmitter. After completion of action block 506, processing continues along line 508 to action block 510.

At action block 510, the user enters a bore diameter and a name that the user associates with the flowtube assembly. After completion of action block 510, processing continues along line 512 to action block 514. At action 514, the flow system is connected to a calibration system that provides one or more calibrated fluid flow rates, which the user enters as data. The flow voltages is measured during the fluid flows. The universal transmitter calculates the constant K from the entered data on fluid flow rates and the measured flow voltages. The constant K (or a calibration number) is stored for later operational use and also displayed to the user. After completion of action block 514, processing continues along line 516 to block 518. At block 518, the user marks the flowtube assembly with the displayed K factor. After completion of action block 518, processing continues along line 520 to action block 522.

At action block 522, the user installs the flowtube assembly and a universal transmitter in an industrial process installation for measurement of the flow of process fluids. After completion of action block 522, processing continues along line 524 to action block 526. At action block 526, the user enters the constant K or calibration number. If the same universal transmitter is used in both the calibration and the industrial installation, the user can simply select the flowtube name, and the previously stored constant K or calibration number will be automatically selected. If a different universal transmitter is used, the user enters the constant K, the inside diameter and the name selected for the flowtube assembly. After completion of action block 526, processing continues along line 528 to action block 530.

At action block 530, the universal transmitter calculates the calibration for the transmitter as a function of the constant K, the bore diameter and other data. The other data can include, for example, a selected setting for the current I that is compatible with the flowtube assembly. After completion of action block 530, processing continues along line 536 to End 538. At end 538, the flowmeter system is available for flow measurements.

FIG. 6 illustrates a third aspect of operation of a calibration converter circuit such as calibration converter circuit 322 in FIG. 3. Processing begins at start 602 when the user selects calibration. Processing continues from start 602 along line 604 to action block 606. At action block 606, the universal transmitter displays selections of calibration routines and processing continues along line 608.

At block 610, the user can select a standard calibration routine for calibrating a standard flowtube assembly that is specifically designed for use with the universal transmitter and processing continues along line 612 to action block 618. At action block 618, a conventional calibration is performed.

The user can select a custom flowtube calibration routine for calibrating a flowtube assembly from a manufacturer that is different than the standard flowtube assembly, but that has information related to calibration marked on it Processing then continues along line 614 to action block 620. Action block 620 can be calibration routine such as the one illustrated in FIG. 4. In block diagram 620, a menu is displayed of the vendor name allowing the user to select the name of the vendor. At block 642, the various model numbers of the vendor are displayed and the user selects the particular model number. Next, at block 644, a display is provided allowing the user to enter the K factor provided by the vendor. This may be, for example, K' as discussed above and may merely be data which is related to the K factor. At block 646, the K factor is calculated using a conversion table 648. Alternatively, a calibration number can be calculated. Finally at block 650, the transmitter may calculate flow based upon the calculated K factor or the calculated calibration number.

The user can select a custom line size calibration routine for calibrating a flowtube assembly that has no nameplate information available. Processing then continues along line 616 to action block 622. Action block 622 can be a calibration routine such as the one illustrate in FIG. 5.

Although the present invention has been described with reference to preferred embodiments, workers skilled in the art will recognize that changes may be made in form and detail without departing from the spirit and scope of the invention.

What is claimed is:

1. A magnetic flow transmitter, comprising:
   a flow converter that calculates a scaled output representative of flow through a magnetic flowtube;
   a calibration converter that performs a calibration calculation routine to produce a calibration constant that couples to the flow converter;
   a data set input that couples a flowtube data set that is associated with a unique flowtube to the calibration converter; and
   a data table that associates multiple flowtube data sets with multiple calibration calculation routines, the data table coupling a calibration calculation routine that is unique to the flowtube data set to the calibration converter.

2. The magnetic flow transmitter of claim 1, wherein the multiple calibration calculation routines are associated with differing relationships between flowtube data sets and calibration calculations for multiple suppliers of magnetic flowtube assemblies.

3. The magnetic flow transmitter of claim 2 wherein the differing relationships include a first data set that relates calibration to flow velocity and a second data set that relates calibration to volumetric flow.

4. The magnetic flow transmitter of claim 2 wherein the differing relationships include a first data set that relates calibration to volumetric flow and a second data set that relates calibration to flowtube diameter.

5. The magnetic flow transmitter of claim 2 wherein the differing relationships include a first data set that relates calibration to a nominal diameter associated with a nominal size of a magnetic flowtube assembly.

6. The magnetic flow transmitter of claim 1 wherein the data set input comprises a keyboard and display in the magnetic flow transmitter.

7. The magnetic flow transmitter of claim 1 wherein the data set input comprises an electrical input that exchanges data with an external data entry device.

8. The magnetic flow transmitter of claim 1 and further comprising:
   an input that couples a flow voltage to the flow converter.

9. The magnetic flow transmitter of claim 1 and further comprising:
   an input that couples a user scale factor to the flow converter.

10. A magnetic flow transmitter, comprising:
    a flow converter that calculates a scaled output representative of flow through a magnetic flowtube;
    a calibration converter that performs a calibration calculation routine to produce a calibration constant that couples to the flow converter;
    a data set input that couples a flowtube data set that is associated with a unique flowtube to the calibration converter; and
    data that associates a flowtube data set with a calibration calculation routine, the calibration calculation routine coupling to the calibration converter.

11. The magnetic flow transmitter of claim 10, wherein the flowtube data set is produced by testing on a calibration stand with a known fluid flow rate.

12. The magnetic flow transmitter of claim 10 wherein the flow transmitter stores a user selected flowtube name associated with the flowtube data set.

13. The magnetic flow transmitter of claim 10 wherein the calibration constant comprises units of flow voltage/(electric current×volumetric flow rate).

14. The magnetic flow transmitter of claim 10 wherein the calibration constant comprises units of flow voltage/volumetric flow rate at an assumed current level.

15. The magnetic flow transmitter of claim 10 wherein the calibration constant comprises units of flow voltage at an assumed current level and an assumed full scale volumetric flow rate.

16. The magnetic flow transmitter of claim 10 wherein the calibration constant comprises units of flow voltage/(current×flow velocity).

17. The magnetic flow transmitter of claim 10 wherein the calibration constant comprises units of flow voltage/flow velocity at an assumed current level.

18. The magnetic flow transmitter of claim 10 wherein the calibration constant comprises a flow voltage at an assumed current and an assumed full scale flow velocity.

19. A magnetic flow transmitter, comprising:
    a flow converter that calculates a scaled output representative of flow through a magnetic flowtube;
    a calibration converter that performs a calibration calculation routine to produce a calibration constant that couples to the flow converter;
    a data set input that couples a flowtube data set that is associated with a unique flowtube to the calibration converter; and
    a data table that associates multiple flowtube data sets with multiple calibration calculation routines, the data table coupling a calibration calculation routine that is unique to the flowtube data set to the calibration converter; and
    a selection circuit that selects either the data table or a standard calibration calculation routine for the calibration converter.

20. The magnetic flow transmitter of claim 19 wherein the selection circuit selects based on user input.

\* \* \* \* \*